United States Patent
DeLeonardo et al.

(10) Patent No.: US 7,153,090 B2
(45) Date of Patent: Dec. 26, 2006

(54) SYSTEM AND METHOD FOR PASSIVE LOAD ATTENUATION IN A WIND TURBINE

(75) Inventors: Guy Wayne DeLeonardo, Glenville, NY (US); Scott Roger Finn, Niskayuna, NY (US); Peter Michael Finnigan, Clifton Park, NY (US); Donald Joseph Kasperski, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 87 days.

(21) Appl. No.: 11/015,259

(22) Filed: Dec. 17, 2004

(65) Prior Publication Data

US 2006/0133937 A1 Jun. 22, 2006

(51) Int. Cl.
*F03B 15/06* (2006.01)

(52) U.S. Cl. .................. 415/4.2; 415/4.4; 416/233; 416/241 R (58) Field of Classification Search ............. 415/4.1, 415/4.2, 4.3, 4.4; 416/232, 233, 241 R, 228
See application file for complete search history.

(56) References Cited

U.S. PATENT DOCUMENTS

| 3,606,580 | A | * | 9/1971 | Kaufman, Sr. ............. 416/232 |
| 3,768,922 | A | * | 10/1973 | Dixon ....................... 416/61 |
| 4,381,960 | A | * | 5/1983 | Pinter et al. ............... 156/175 |
| 5,474,425 | A | * | 12/1995 | Lawlor ................... 416/223 R |
| 5,499,904 | A | * | 3/1996 | Wallace et al. ............. 416/230 |
| 2005/0214122 | A1 | * | 9/2005 | Sorensen et al. ........... 416/233 |

* cited by examiner

*Primary Examiner*—Hoang Nguyen
(74) *Attorney, Agent, or Firm*—Fletcher Yoder (57) ABSTRACT

In accordance with certain embodiments, a wind turbine blade includes an outer skin and an internal support structure. The skin has a closed airfoil shape and includes an outer surface, an inner surface, and opposite sides along a length of the blade. The internal support structure is disposed within the closed airfoil shape. The internal support structure includes at least one shear load bearing member disposed across the opposite sides and oriented lengthwise along the length of the blade. The internal support structure further includes a plurality of bending load bearing members disposed along the inner surface in a lengthwise direction along the length of the blade. The internal support structure is configured to position a shear center and a center of aerodynamic pressure loading of the blade at different locations relative to one another.

21 Claims, 5 Drawing Sheets

SYSTEM AND METHOD FOR PASSIVE LOAD ATTENUATION IN A WIND TURBINE

BACKGROUND

The invention relates generally to wind turbines, and particularly to rotating blades of wind turbines. Specifically, embodiments of the present technique provide a system and method to passively attenuate wind loads on the rotating blades of wind turbines.

Wind turbines are regarded as environmentally safe and relatively inexpensive alternative sources of energy that utilize wind energy to produce electricity. A wind turbine generally includes a rotor having multiple blades, which transform wind energy into a rotational motion of a drive shaft. The drive shaft is rotationally coupled to a rotor of a generator, which transforms the rotational energy into electrical power.

Wind turbine blades often operate under atmospheric turbulence, resulting from disturbances in wind velocity. Such disturbances subject the wind turbine blades to aerodynamic bending and shear loads, which result in fatigue of the rotating blades. At times, these loads can be relatively high and damaging to the wind turbine blades. An important design consideration for wind turbine blades is, therefore, the ability to withstand maximum wind loading. Hence the blades should desirably be designed to tolerate the maximum bending and shear loads.

In certain systems, these high loads can be reduced by actively controlling the wind turbine system. This active control leads to lower weight and structural components of the blades, which in turns leads to lower cost blades. Load attenuation in turbine blades is generally achieved by actively regulating the pitch of the blades by twisting the blades, thereby influencing the angle of attack of the wind on the blades. A change in the angle of attack changes the bending load to which the blade is subjected. When pitch changes are sufficiently rapid, they can affect not only the average wind load on the blades, but also vibratory loads influencing fatigue life throughout the system. Generally, twisting toward feather (i.e. more closely aligned with the direction of the wind) in response to increasing winds reduces the aerodynamic loading on the blades, and hence, the rest of the wind turbine system. For example, the system may sense wind velocity and, in response, actively adjust the orientation of the wind turbine blades.

Alternatively, these high loads can be reduced by passively controlling the wind turbine system using a fiber material that is biased off-axis to the longitudinal axis of the blade. A wind turbine blade includes an outer skin disposed about structural members, such as crossbeams. For example, the crossbeams may be configured as shear webs, which have opposite side structures or spar caps. Under a wind load, the shear webs bear the shear loads, while the spar caps bear the bending loads. For passive attenuation of the wind loads, a substantial majority of fibers in the blade skin and/or the spar cap are inclined at an angle (generally between 15 and 30 degrees) to the axis of the blade, thereby feathering the blades to alleviate loading in extreme wind conditions. Unfortunately, this biased fiber lay-up material consumes additional material for the same load carrying capability of the blade. This increased material consumption is due to the angled orientation of the fibers, which are no longer oriented with the load. Accordingly, the blades are heavier and more costly to manufacture.

Accordingly, there is a need for an improved technique for passively attenuating wind loading on wind turbine blades that is relatively low cost and less bulky than existing techniques.

BRIEF DESCRIPTION

The present technique accordingly provides a novel approach to address the aforementioned problems. In one aspect, the present technique provides a wind turbine blade. The wind turbine blade includes an outer skin and an internal support structure. The skin has a closed airfoil shape and includes an outer surface, an inner surface, and opposite sides along a length of the blade. The internal support structure is disposed within the closed airfoil shape. The internal support structure includes at least one shear load bearing member disposed across the opposite sides and oriented lengthwise along the length of the blade. The internal support structure further includes a plurality of bending load bearing members disposed along the inner surface in a lengthwise direction along the length of the blade. The internal support structure is configured to position a shear center and a center of aerodynamic loading of the blade at different locations relative to one another. In another aspect, the present technique provides a wind turbine having a rotor including a plurality of blades as discussed above. In yet another aspect, the present technique provides a method for manufacturing a wind turbine blade as described above.

In yet another aspect, the present technique provides a method for operating a wind turbine. The method includes rotating a wind turbine blade and attenuating a wind load on the wind turbine blade by passively twisting the wind turbine blade to feather in response to bending of the wind turbine blade due to the wind load. Passive twisting of the wind turbine blades in response to bending is achieved via an eccentricity between a shear center and a center of aerodynamic loading of the blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The technique described below provides a system and method for improving wind turbine performance by alleviating bending and shear loads on the wind turbine blades. The present technique employs the use of a passively adaptive wind turbine blade that modifies its aerodynamic configuration based on the extent of wind loading on the blade, thereby attenuating cyclic loading of the blade due to turbulence in wind velocity. As discussed in detail below, certain embodiments of the present technique employ a variety of internal support structures, such as C-shaped, Z-shaped, and unsymmetrical structures, which effectuate a twisting motion of the turbine blades in response to bending caused by strong turbulent/cyclic winds. This twisting motion causes the turbine blades to become more closely aligned with the direction of the wind, thereby reducing wind loads on the turbine blades. This reduced cyclic loading, in turn, extends fatigue life of the blade as well as other load bearing structures in the wind turbine apparatus.

Figure 1:
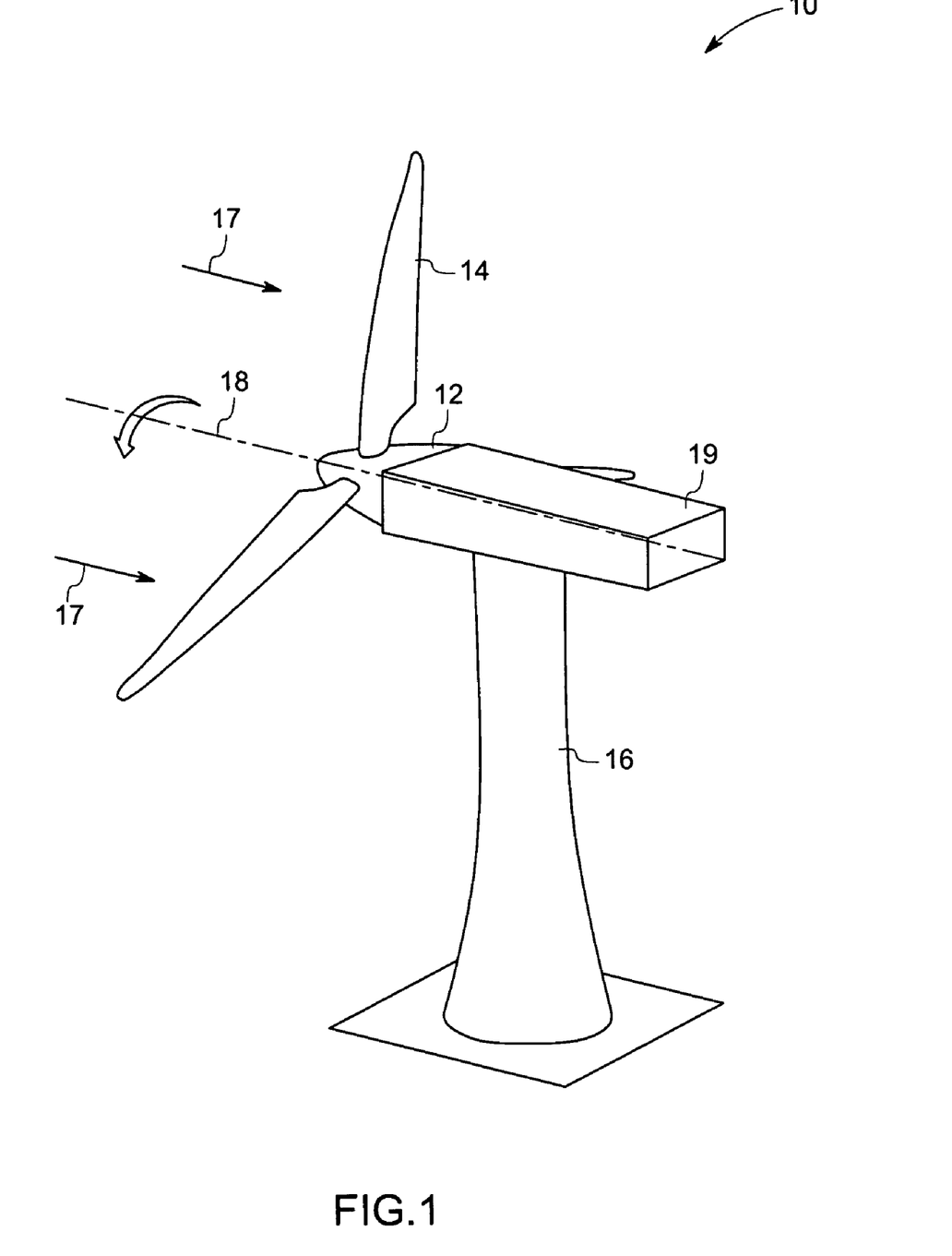
FIG. 1 is a perspective view of a wind turbine having passive control features in accordance with embodiments of the present technique.

Turning now to the drawings, FIG. 1 is a perspective view of a wind turbine 10 in accordance with embodiments of the present technique. The wind turbine 10 includes a rotor 12 having multiple blades 14 mounted atop a tower 16. The tower 16 exposes the blades 14 to wind 17, which causes the blades 14 to rotate about an axis 18. The blades 14 convert the mechanical energy of the wind into a rotational torque of the rotor 12, which is utilized to drive an electrical generator 19 to produce electrical power.

Figure 2:
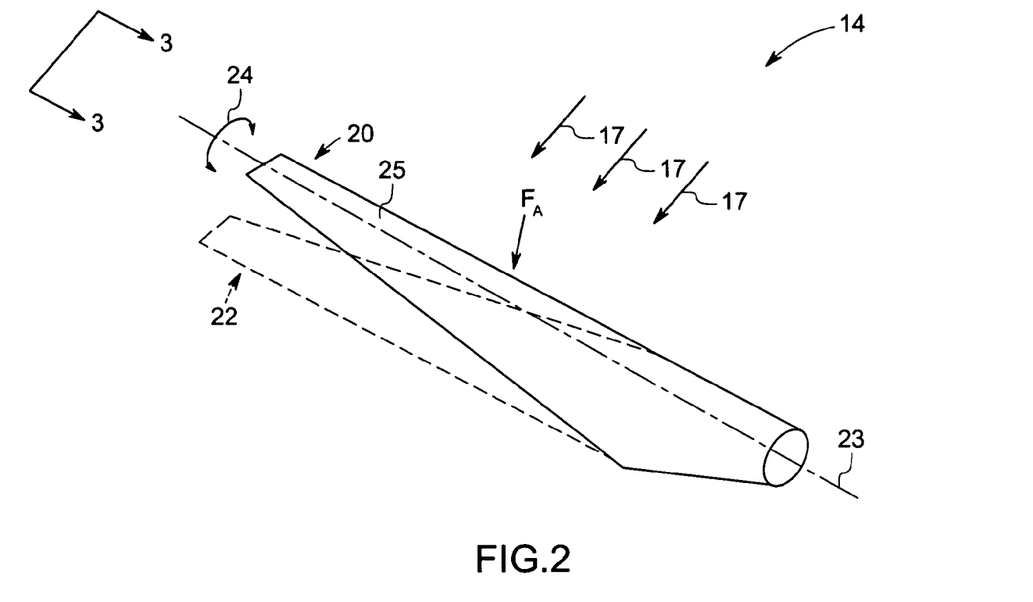
FIG. 2 is a perspective view of a wind turbine blade having passive control features in accordance with embodiments of the present technique.
Figure 3:
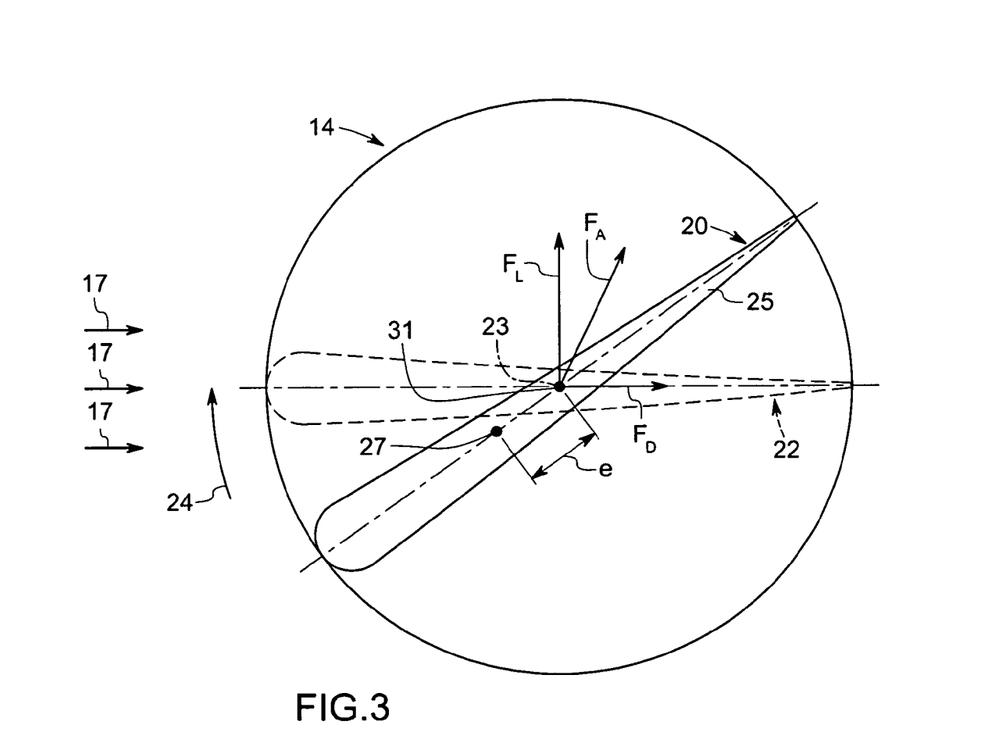
FIG. 3 is an end view of a wind turbine blade having passive control features in accordance with embodiments of the present technique

Referring generally to FIGS. 2 and 3, a wind turbine blade 14 is illustrated having passive wind load control features in accordance with aspects of the present techniques. FIG. 2 illustrates a perspective view while FIG. 3 illustrates an end view of the blade 14. In the absence of wind forces or aerodynamic loading, the blade 14 has an unloaded configuration 20 represented by the solid lines. Under the action of an aerodynamic load ($F_A$), the blade 14 may be subject to aerodynamic shear forces and bending moments, which cause the blade 14 to deflect or bend from the unloaded configuration 20 (solid lines) to an aerodynamically loaded configuration 22 (dashed lines). Further, atmospheric turbulence cause random fluctuations in these loads and deflections. As illustrated in FIG. 3, the aerodynamic load ($F_A$) may be resolved into a drag force ($F_D$) in the direction of the wind 17, and a lift force ($F_L$) perpendicular to the direction of the wind 17. The drag force ($F_D$) is responsible for shear loads while the lift force ($F_L$) is responsible for bending loads on the blade 14.

As mentioned earlier, such aerodynamic loads on the wind turbine blades 14 depend on the angle of attack of wind on those blades 14. Hence, in accordance with aspects of the present technique, the blade 14 may be configured to twist about a longitudinal axis 23, as indicated by arrow 24, in response to bending along the longitudinal axis 23 of the blade 14 caused by wind forces or aerodynamic loads. In this manner, the bending-induced twisting 24 passively modifies the angle of attack of wind on the blade 14 in response to the aerodynamic loading of the blade 14. In certain embodiments, the blade 14 may be adapted to twist 24 toward feather (i.e. toward a position in which the angle of attack by the wind is zero degrees with respect to the face 25 the blade 14) in response to bending caused by the wind, thereby reducing aerodynamic loading on the wind turbine blades 14.

Aspects of the present technique provide novel arrangements of the internal load bearing components of composite wind turbine blades to facilitate coupling between bending and twisting of the blades, thus exploiting load mitigation prospects of a blade that twists toward feather as it bends. The illustrated embodiments are configured to facilitate bending-induced twisting, or bend-twist coupling, by providing an eccentricity (e) between a shear center 27 and a center of aerodynamic loading 31 (referred to hereinafter as center of pressure) of the blade. The center of pressure 31 refers to a point on a section of the blade 14 through which the total aerodynamic load ($F_A$) on the blade 14 is said to act. The shear centre 27 refers to a point in a section of the blade 14 such that a transverse load on the section through the shear center 31 produces no twisting moment on the blade 14. The eccentricity (e) between the shear center 27 and the center of pressure 31 creates a moment equal to the product of the bending load ($F_L$) and the distance (e) between the shear center 27 and the center of pressure 31 that twists the leading edge of the blade toward feather as the blade bends due to the action of the bending load ($F_L$).

It should be noted that shear center 27 of the blade 14 is a structural property of the blade 14 while the center of pressure 31 is a function of the aerodynamic definition of the blade section. The location of the shear center in the cross-section of the blade 14 depends on the configuration of the internal support structure (i.e., the number, shape, and position of the load bearing members) and, also, the particular materials used to form the internal support structure and other portions of the blade 14. Thus, various embodiments in accordance with the present technique may be envisaged to bring about a desired degree of eccentricity between the shear center and the center of pressure of the blade 14. Certain embodiments of the present technique illustrated hereinafter with reference to FIGS. 4–7.

Figure 4:
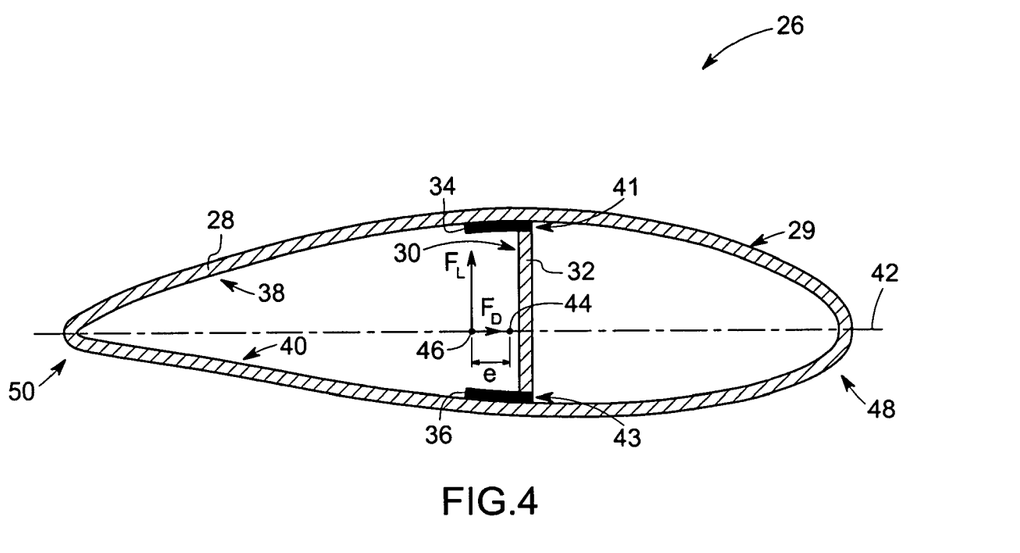
FIG. 4 is a cross-sectional side view of a wind turbine blade comprising an internal support structure having a C-shaped structure in accordance with one embodiment of the present technique.

Turning now to these illustrations, FIG. 4 is a cross-sectional side view of a wind turbine blade 26 in accordance with aspects of the present technique. The blade 26 includes an outer skin 28 having a closed airfoil shape 29. In certain embodiments, the skin 28 is formed from a material comprising fiber glass, wood, resin, or combinations thereof. Within the skin 28 is disposed an internal support structure 30 adapted to bear aerodynamic loads ($F_L$ and $F_D$) on the blade 26. In the illustrated embodiment, the internal support structure 30 includes a crossbeam 32 disposed between and connected to opposite side structures 34 and 36. In certain embodiments, the side structures 34 and 36 may be formed from carbon, or glass, or wood, or different combinations thereof. The crossbeam 30 is adapted to bear aerodynamic shear loads ($F_D$) on the blade 26, and is also referred to as shear web. In various embodiments, the crossbeam 32 may be formed from foam, wood, fiber glass, carbon, or combinations thereof. The side structures 34 and 36, also referred to as spar caps, may be adapted to bear aerodynamic bending loads ($F_L$) on the blade 26, and are disposed on opposite sides 38 and 40 of a central chord 42 of the airfoil section.

In accordance with the illustrated embodiment, the crossbeam 32 is disposed between the side structures 34 and 36 in an off-center position relative to opposite ends 41 and 43 of the crossbeam 32, such that the internal support structure 30 has a C-shaped configuration. The C-shaped configuration advantageously provides an eccentricity (e) between a shear center 44 and the center of pressure 46 of the blade 26. In the illustrated embodiment, the crossbeam 32 is displaced or offset from the center of pressure 44 toward a leading edge 48 of the blade 26. In a different embodiment, the crossbeam 32 may be displaced or offset from the center of pressure 44 toward a trailing edge 50 of the blade 26. In accordance with the present technique, the eccentricity (e) creates a moment equal to the product of the bending load ($F_L$) and the distance (e) between the shear center 44 and the center of pressure 46 causing a leading edge 48 of the blade 26 to twist downwards in response to bending of the blade 26 due the bending load ($F_L$). In certain embodiments, the eccentricity (e) may be optimally determined so as to provide a desired bending-induced twisting or bend-twist coupling, while maintaining a desirable structural stiffness of the blade 26. For blades of length in the range of 37 to 40 meters, the use of a C-shaped internal structure induces a twist from hub to root on the order of five degrees. This amount of induced twist is effective at reducing fatigue loads on the order of 10 percent.

Figure 5:
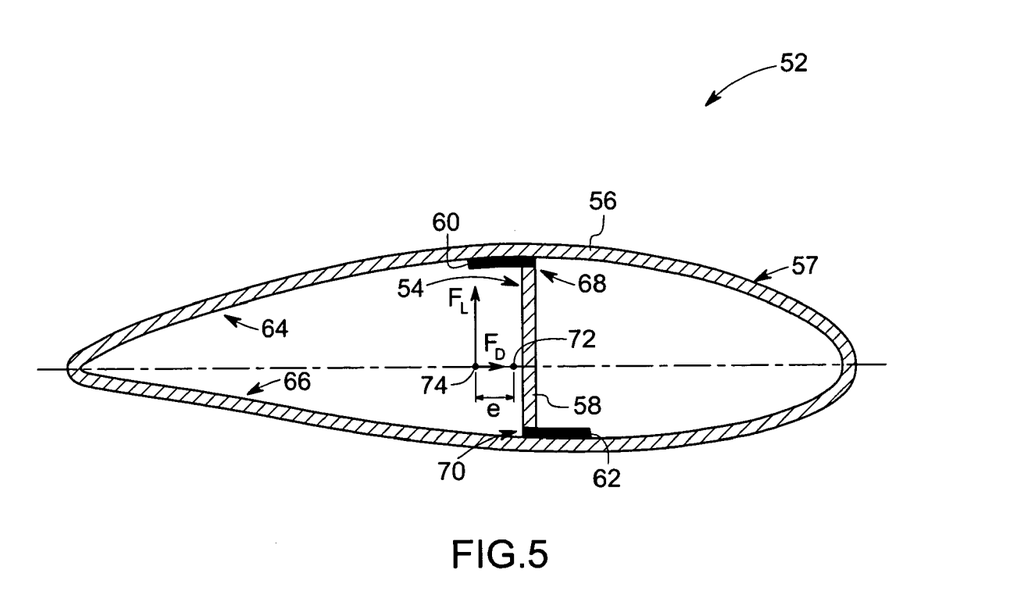
FIG. 5 is a cross-sectional side view of a wind turbine blade comprising an internal support structure having a Z-shaped structure in accordance with another embodiment of the present technique.

Alternately, an eccentricity between the shear center and the center of pressure may be attained by a Z-shaped configuration of the internal support structure of the blade. FIG. 5 illustrates a cross-sectional view of a blade 52 having a Z-shaped internal support structure 54 in accordance with one embodiment of the present technique. The internal support structure 54 is housed in an outer skin 56 having a closed airfoil shape 57, wherein the internal support structure 54 comprises a shear load bearing crossbeam 58 (i.e., bears shear load $F_D$) disposed across the space between bending load bearing side structures 60 and 62 (i.e., bears bending load $F_L$). The side structures 60 and 62 of the internal support structure 54 are disposed on opposite sides 64 and 66 of the skin 56, such that the side structures 60 and 62 are off-center, in opposite directions, relative to opposite ends 68 and 70 of the crossbeam 58. In this unsymmetrical configuration, the side structures 60 and 62 and the crossbeam 58 are configured in a Z-shape. This unsymmetrical Z-shaped configuration is adapted to produce a desired eccentricity (e) between a shear center 72 and a center of pressure 74 of the blade 52.

In further embodiments, eccentricity (e) may also be influenced by forming the side structures from different materials. Such embodiments induce an eccentricity in a direction of increasing material thickness. The product of this eccentricity and the component of aerodynamic pressure as resolved along the chord line ($F_D$) produces a twisting moment in response to bending of the blade caused by the aerodynamic pressure.

Figure 6:
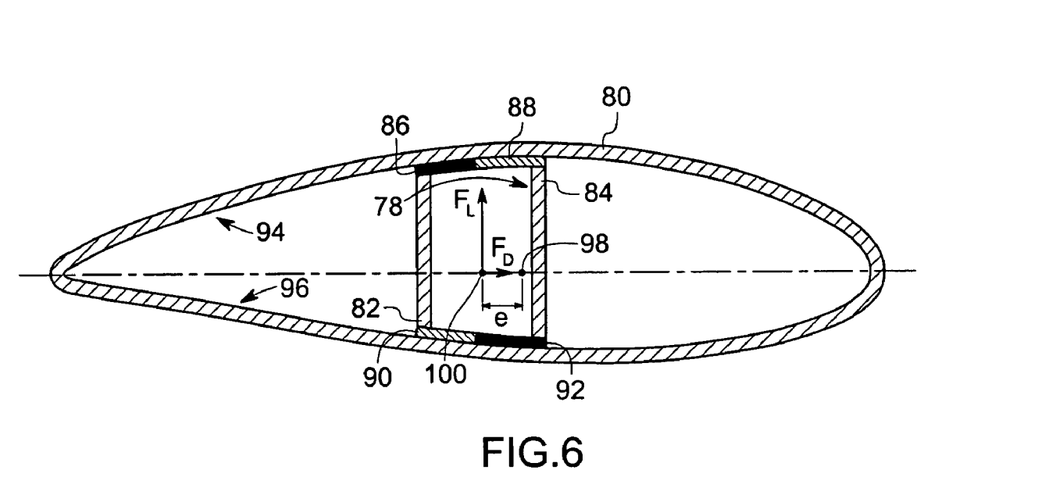
FIG. 6 is a cross-sectional side view of a wind turbine blade comprising an internal support structure having an unsymmetrical box structure in accordance with another embodiment of the present technique.

FIG. 6 illustrates a blade 76 employing bend-twist coupling according to yet another embodiment of the present technique. As illustrated, the blade 76 includes an internal support structure 78 disposed within a skin 80 and having an unsymmetrical box-shaped configuration. The box-shaped internal support structure 78 includes a pair of crossbeams 82 and 84 adapted to bear aerodynamic shear loads ($F_D$) on the blade 76. In the illustrated embodiment, the internal support structure 78 includes two pairs of bending load bearing side structures 86, 88 and 90, 92 (i.e., bears bending load $F_L$) disposed on opposite sides 94 and 96 of the skin 80. The side structures 86, 88, 90, and 92 may be formed from materials having different stiffnesses. Location of shear center 98 of the blade 76 is a function of material stiffnesses of the components and the positions of the internal support structure 78. Hence, employing an internal support structure 78 having an unsymmetrical stiffness distribution in accordance with the illustrated embodiment produces an eccentricity (e) between a shear center 98 and a center of pressure 100 of the blade 76. In one embodiment, side structures 86 and 92 may me formed from similar materials, such as materials including carbon, while side structures 88 and 90 may be formed from a different material, such as glass. Other pairs of different materials for the side structures 86 and 92 and the side structures 88 and 92 include. The eccentricity (e), as described earlier, enables the blade 76 to twist in response to bending applied along the length of the blade 76, thereby reducing aerodynamic loads in relatively high and/or turbulent winds.

Figure 7:
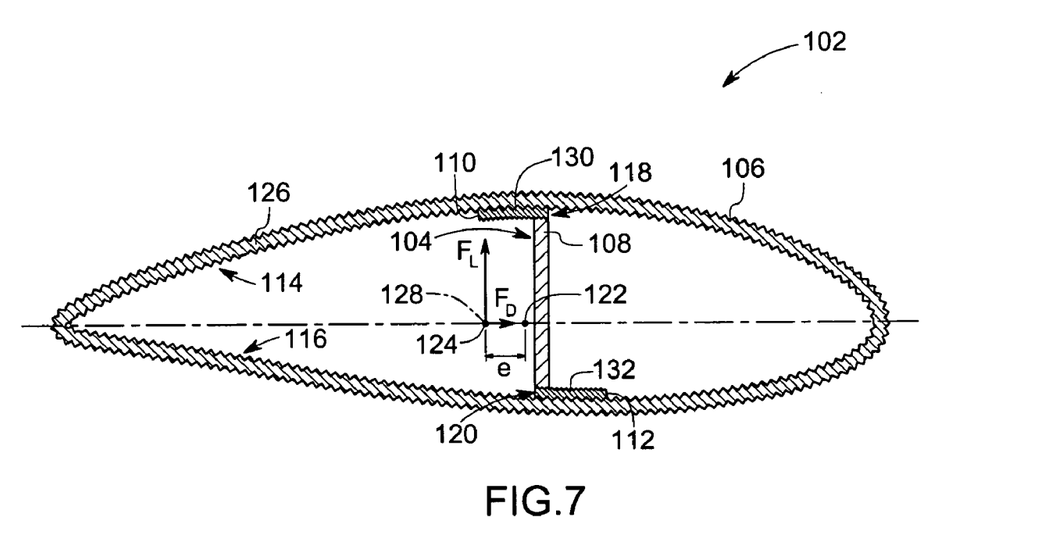
FIG. 7 is a cross-sectional side view of a wind turbine blade comprising an internal support structure having a Z-shaped structure and comprising an angled multi-layer material in accordance with another embodiment of the present technique.
Figure 8:
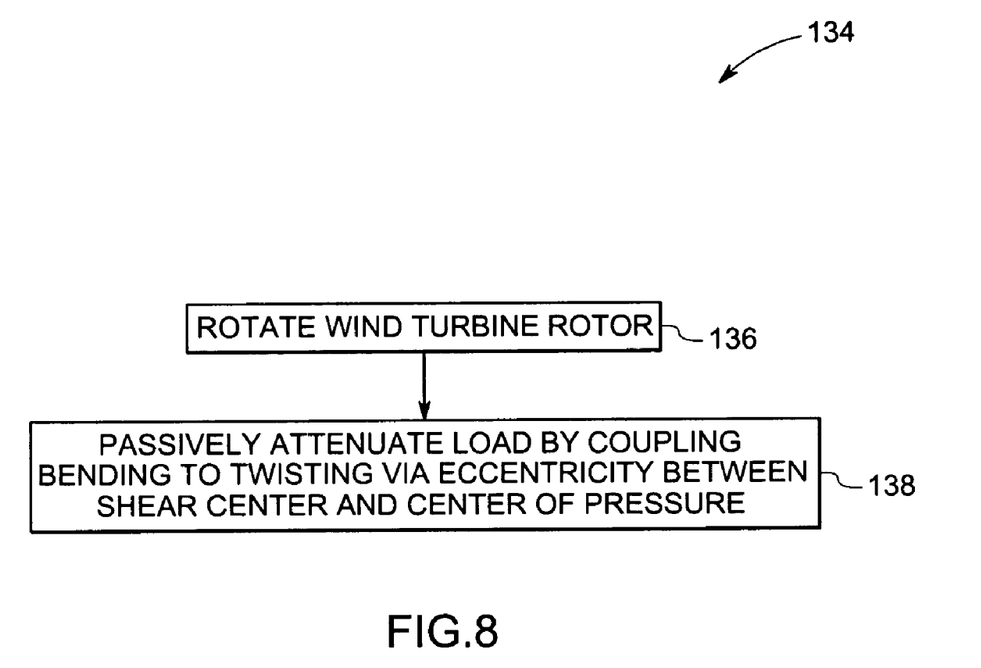
FIG. 8 is a flowchart illustrating an exemplary method of operating a wind turbine in accordance with aspects of the present technique.

The above-described techniques may further be employed in conjunction with tailoring of the skin and/or the side structures via use of off-axis fibers to effectuate a desired bend-twist coupling in the wind turbine blades. In an exemplary embodiment, FIG. 7 illustrates a blade 102 having angled material plies and an unsymmetrical internal support structure, e.g., a Z-shaped internal support structure 104. It should be noted that such ply tailoring techniques may be employed in any of the aforementioned embodiments and other embodiments in accordance with the present technique. As illustrated in FIG. 7, the internal support structure 104 is disposed within a closed airfoil-shaped skin 106. The internal support structure 104 comprises a shear load bearing crossbeam 108 (i.e., bears the shear load $F_D$) disposed across the space between bending load bearing side structures 110 and 112 (i.e., bears the bending load $F_L$). The side structures 110 and 112 of the internal support structure 104 are disposed on opposite sides 114 and 116 of the skin 106, such that the side structures 110 and 112 are positioned off-center relative to opposite ends 118 and 120 of the crossbeam 108, thereby forming a Z-shaped configuration. As described for the earlier embodiment, this unsymmetrical Z-shaped configuration is adapted to produce a desired eccentricity (e) between a shear center 122 and a center of pressure 124 of the blade 102. Additionally, in the illustrated embodiment, the skin 106 may be formed of an angled fiber material (represented by the numeral 126), wherein a majority of fibers are inclined at an angle (generally between 15 and 30 degrees) to an axis 128 of the blade 102 (perpendicular to the plane of FIG. 7). Further, a majority of fibers 130 and 132 of the side structures 110 and 112 may also be inclined at a similar angle to the blade-axis 128. The off-axis or angled fibers 126, 130 and 132 are adapted to provide additional bend-twist coupling (bending-induced twisting) in conjunction with the present technique. In certain embodiments, the angled fibers 126 of the skin 106 and/or the angled fibers 130 and 132 of the side structures 110 and 112 may be biased by providing an extra twist when the blade 102 is unloaded, such that when the blade 102 is operated in winds near peak desired efficiency, the blade 106 untwists under load to a traditionally optimal twist distribution.

Turning now to FIG. 7, this figure is a flowchart illustrating an exemplary method 134 of operating a wind turbine in accordance with aspects of the present technique. The method 134 begins at block 136 by operating the wind turbine such as to rotate the wind turbine blades. Next, at block 138, the method proceeds by attenuating a wind load on the wind turbine blade by passively twisting the wind turbine blade to feather in response to bending of the wind turbine blade due to the wind load. In certain embodiments as discussed in detail above, this bending-induced twisting is achieved by producing an eccentricity between the shear centre and the centre of pressure of the blade.

As will be appreciated, the above described techniques provide effective alleviation of aerodynamic loading on wind turbine blades by passive response of the blades to modify their aerodynamic configuration based on the extent of the aerodynamic loads acting on them. The present techniques are particularly advantageous because of the simplicity in manufacturing as well as the reduced material cost incurred in the process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine blade, comprising:
   a skin comprising a closed airfoil shape, an outer surface, an inner surface, and opposite sides along a length of the blade; and
   an internal support structure disposed within the closed airfoil shape, comprising:
      at least one shear load bearing member that is disposed across the opposite sides and that is oriented lengthwise along the length of the blade; and
      a plurality of bending load bearing members disposed along the inner surface in a lengthwise direction along the length of the blade, wherein the internal support structure is configured to position a shear center and a center of aerodynamic pressure loading at different locations relative to one another.

2. The wind turbine blade of claim 1, wherein the at least one shear load bearing member comprises a beam and the plurality of bending load bearing members comprise a pair of side structures disposed on opposite sides of the beam, wherein the side structures are off center relative to the opposite sides of the beam.

3. The wind turbine blade of claim 2, wherein the pair of side structures comprise different materials from one another.

4. The wind turbine blade of claim 1, wherein the internal support structure has a C-shaped cross-section defined by the at least one shear load bearing member and a pair of bending load bearing members.

5. The wind turbine blade of claim 1, wherein the internal support structure has a Z-shaped cross-section defined by the at least one shear load bearing member and a pair of bending load bearing members.

6. The wind turbine blade of claim 1, wherein the at least one shear load bearing member comprises a pair of beams and the plurality of bending load bearing members comprise a pair of side structures disposed on opposite sides of each beam, wherein the side structures comprise different materials relative to one another.

7. The wind turbine blade of claim 1, wherein the at least one shear load bearing member comprises a pair of beams and the plurality of bending load bearing members comprise a pair of side structures disposed on opposite sides of each beam, wherein the beams and side structures are arranged in a box-shaped configuration.

8. The wind turbine blade of claim 1, wherein the plurality of bending load bearing members comprise different materials configured to produce a structural eccentricity in the internal support structure in a direction of increasing material thickness.

9. The wind turbine blade of claim 1, wherein the internal support structure comprises a material including carbon, or glass, or any combinations thereof.

10. The wind turbine blade of claim 1, wherein the internal support structure is configured for passively attenuating a wind load applied to the wind turbine blade by feathering the closed airfoil shape.

11. A wind turbine blade, comprising:
    a skin having a closed airfoil shape;
    a beam disposed across the closed airfoil shape and oriented in a lengthwise direction along the length of the wind turbine blade, wherein the beam is configured to bear a shear load; and
    first and second side structures disposed on opposite sides of the beam, wherein the beam and the first and second side structures are oriented unsymmetrical relative to one another to provide twisting of the closed airfoil shape in response to bending of the wind turbine blade.

12. The wind turbine blade of claim 11, wherein the beam and the first and second side structures are configured to provide eccentricity between a shear center and a center of aerodynamic pressure loading.

13. The wind turbine blade of claim 11, wherein off-center portions of the first and second side structures are coupled to the beam.

14. The wind turbine blade of claim 1, wherein the first and second side structures comprise different materials configured to produce a structural eccentricity in the wind turbine blade in a direction of increasing material thickness.

15. A wind turbine, comprising:
    a rotor comprising a plurality of blades mounted atop a tower, each of the plurality of blades further comprising:
       a skin having a closed airfoil shape, an outer surface, an inner surface, and opposite sides along the length of the blade ; and
       an internal support structure disposed within the closed airfoil shape, comprising:
          at least one shear load bearing member that is disposed across the opposite sides and that is oriented lengthwise along the length of the blade; and
          a plurality of bending load bearing members disposed along the inner surface in a lengthwise direction along the length of the blade, wherein the internal support structure is configured to position a shear center and a center of aerodynamic pressure loading at different locations to one another.

16. A method of manufacturing a wind turbine blade, comprising:
    providing a skin having a closed airfoil shape, an outer surface, an inner surface, and opposite sides along a length of the blade; and
    providing an unsymmetrical internal support structure within the closed airfoil shape to position a shear center and a center of aerodynamic pressure loading at different locations relative to one another.

17. The method of claim 16, wherein providing an unsymmetrical internal support structure further comprises:
    disposing at least one shear load bearing member across the opposite sides and that is oriented lengthwise along the length of the blade; and
    disposing a plurality of bending load bearing members along the inner surface in a lengthwise direction along the length of the blade.

18. The method of claim 17, wherein disposing the at least one shear load bearing member comprises disposing a beam and disposing the plurality of bending load bearing members comprises disposing a pair of side structures opposite sides of the beam, wherein the side structures are off center relative to the opposite sides of the beam.

19. The method of claim 17, wherein disposing the at least one shear load bearing member comprises disposing a pair of beams and disposing the plurality of bending load bearing members comprises disposing a pair of side structures on opposite sides of each beam, arranging the beams and side structures in a box-shaped configuration, wherein the side structures comprise different materials relative to one another.

20. The method of claim 18, wherein providing the skin and providing the unsymmetrical internal support structure comprises providing fibers inclined at an angle relative to an axis of the blade.

21. A method for operating a wind turbine, comprising: rotating a wind turbine blade; and attenuating a wind load on the wind turbine blade by passively twisting the wind turbine blade to a feathered position in response to bending of the wind turbine blade due to the wind load via an eccentricity between centers of shear loading and aerodynamic pressure loading.

* * * * *